(12) United States Patent
Kuwata et al.

(10) Patent No.: US 7,849,874 B2
(45) Date of Patent: Dec. 14, 2010

(54) SLIDE VALVE APPARATUS AND METHOD OF MANUFACTURING SLIDE VALVE APPARATUS

(75) Inventors: Masahiro Kuwata, Kawasaki (JP); Hajime Sudo, Matsudo (JP); Takehiko Kitamori, Tokyo (JP)

(73) Assignees: Kabushiki Kaisha Toshiba, Tokyo (JP); Kanagawa Academy of Science and Technology, Kawasaki-shi (JP)

( * ) Notice: Subject to any disclaimer, the term of this patent is extended or adjusted under 35 U.S.C. 154(b) by 1099 days.

(21) Appl. No.: 11/229,695

(22) Filed: Sep. 20, 2005

(65) Prior Publication Data

US 2006/0060811 A1 Mar. 23, 2006

(30) Foreign Application Priority Data

Sep. 22, 2004 (JP) .............................. 2004-276211

(51) Int. Cl.
*F16K 3/02* (2006.01)
(52) U.S. Cl. ........................ 137/375; 251/327; 251/328
(58) Field of Classification Search ......... 251/326–329; 137/375
See application file for complete search history.

(56) References Cited

U.S. PATENT DOCUMENTS

| | | | | |
|---|---|---|---|---|
| 3,160,015 A | * | 12/1964 | Charlton et al. | 137/625.68 |
| 3,400,441 A | * | 9/1968 | Fryling | 251/327 |
| 3,508,573 A | * | 4/1970 | Smith | 137/375 |
| 3,521,674 A | * | 7/1970 | Dodson et al. | 251/367 |
| 3,763,880 A | * | 10/1973 | Leopold et al. | 251/327 |
| 3,776,276 A | * | 12/1973 | Stiltner | 251/328 |
| 3,908,463 A | * | 9/1975 | Bedo et al. | 251/187 |
| 4,128,008 A | * | 12/1978 | Linenberg | 73/863.12 |

(Continued)

FOREIGN PATENT DOCUMENTS

JP 58-16142 3/1983

(Continued)

OTHER PUBLICATIONS

William H. Grover, et al., "Monolithic membrane valves and diaphragm pumps for practical large-scale integration into glass microfluidic devices", Sensors and Actuators B, 89, 2003, pp. 315-323.

(Continued)

*Primary Examiner*—John Bastianelli
(74) *Attorney, Agent, or Firm*—Oblon, Spivak, McClelland, Maier & Neustadt, L.L.P.

(57) ABSTRACT

A slide valve apparatus includes a first member having a first fluid channel for allowing a fluid to flow therethrough, a second member sliding along the first member and having a second fluid channel formed in a manner to communicate with the first fluid channel, and a first elastic membrane formed in the sliding surface along which the second member and the first member slide relative to each other and having a first communicating hole communicating with the first fluid channel. In manufacturing the slide valve apparatus, a gas is spurted from the open edge of the first fluid channel in at least a stage between the start up of the step of forming the elastic membrane and the end of the step of baking the elastic membrane so as to form in the elastic membrane the communicating hole communicating with the first fluid channel.

16 Claims, 10 Drawing Sheets

U.S. PATENT DOCUMENTS

| | | | | |
|---|---|---|---|---|
| 4,458,879 A | * | 7/1984 | Jandrasi | 251/326 |
| 4,572,298 A | * | 2/1986 | Weston | 251/327 |
| 4,643,395 A | * | 2/1987 | Williams, Jr. | 251/327 |
| 5,143,348 A | * | 9/1992 | Baker et al. | 251/326 |
| 5,261,454 A | * | 11/1993 | Pavlica et al. | 251/327 |
| 5,454,547 A | * | 10/1995 | Brown | 251/327 |
| 5,464,035 A | * | 11/1995 | Heinecke | 251/327 |
| 5,836,570 A | * | 11/1998 | Blenkush et al. | 251/328 |
| 5,850,845 A | * | 12/1998 | Pereira et al. | 251/329 |
| 5,899,438 A | * | 5/1999 | Gunder | 251/327 |
| 6,199,870 B1 | * | 3/2001 | Zosel | 251/328 |
| 6,315,049 B1 | * | 11/2001 | Hickey et al. | 251/325 |
| 6,592,098 B2 | * | 7/2003 | Kao et al. | 251/129.01 |
| 2007/0090314 A1 | * | 4/2007 | Van Der Wijngaart et al. | 251/129.06 |

FOREIGN PATENT DOCUMENTS

| | | |
|---|---|---|
| JP | 59-3369 | 1/1984 |
| JP | 62-68571 | 3/1987 |
| JP | 2-248774 | 10/1990 |
| JP | 2-269952 | 11/1990 |
| JP | 5-142117 | 6/1993 |
| JP | 5-67361 | 9/1993 |
| JP | 8-178091 | 7/1996 |
| JP | 9-269073 | 10/1997 |
| JP | 2003-127388 | 5/2003 |
| JP | 2005-83510 | 3/2005 |
| JP | 2005-106286 | 4/2005 |

OTHER PUBLICATIONS

Jeremy A. Frank, et al., "Low-Leakage Micro Gate Valves", Transducers '03, The 12th International Conference on Solid State Sensors, Actuators and Microsystems, Jun. 8-12, 2003, pp. 143-146.

* cited by examiner

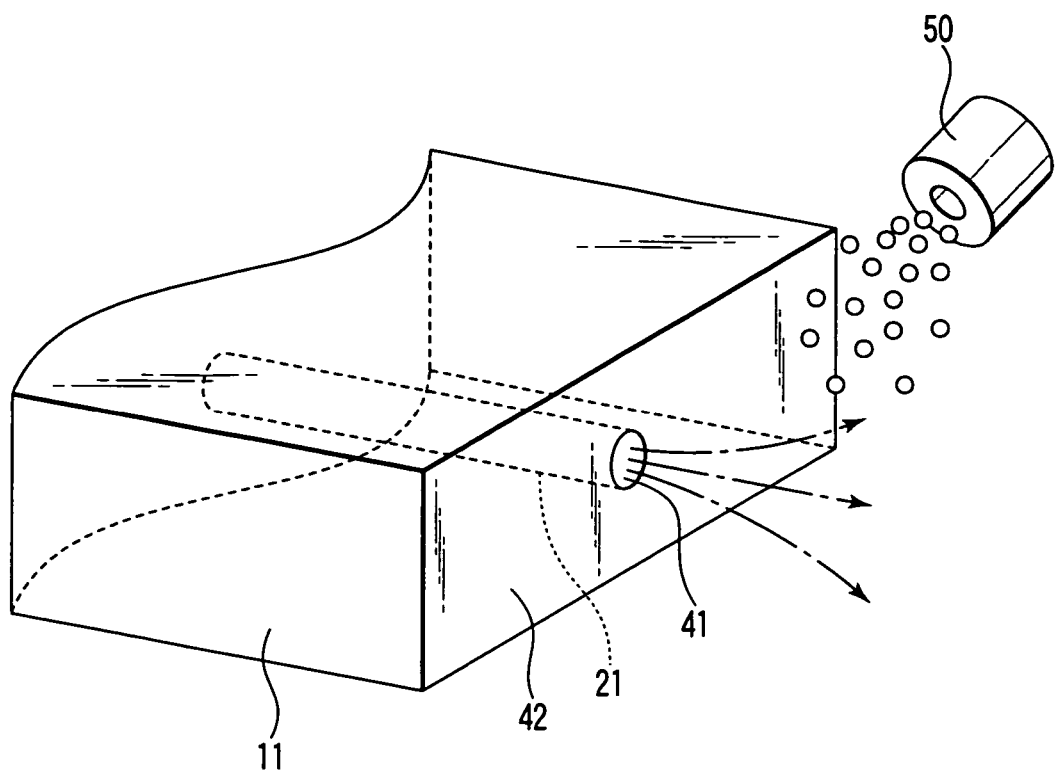
F I G. 7
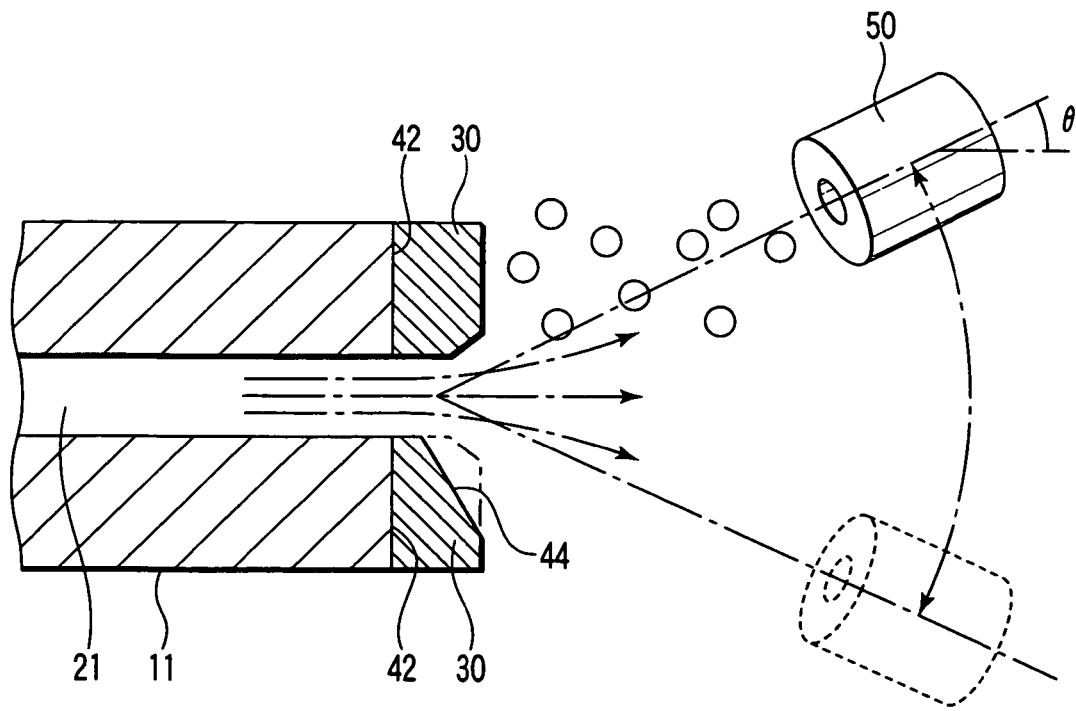
F I G. 8

SLIDE VALVE APPARATUS AND METHOD OF MANUFACTURING SLIDE VALVE APPARATUS

CROSS-REFERENCE TO RELATED APPLICATIONS

This application is based upon and claims the benefit of priority from prior Japanese Patent Application No. 2004-276211, filed Sep. 22, 2004, the entire contents of which are incorporated herein by reference.

BACKGROUND OF THE INVENTION

1. Field of the Invention

The present invention relates to a slide valve apparatus and a method of manufacturing the slide valve apparatus, particularly, to a slide valve apparatus used in a micro chip for performing the reaction and the analytical chemistry and to a method of manufacturing the same.

2. Description of the Related Art

In recent years, it attracts attentions to carry out a chemical reaction in a micro space in a micro chip partly because it is possible to decrease markedly the amounts of the sample and the reagent used in the analysis of, for example, the health and the environment and partly because it is possible to increase the reaction rate. Also, it is desirable to mount a valve to a micro chip in order to further improve the reaction and the analysis.

Several methods have been proposed to date in respect of the mounting of a valve to a micro chip including the method of deforming a membrane so as to close the fine fluid channel within the micro chip. For example, known is "Monolithic membrane valve and diaphragm pump for practical large-scale integration into glass microfluidic devices" by Grover, W. H. et al, Sens. Actuators, B2003, 89, pp. 315-323. In the membrane system, a membrane made of a soft material having a high resistance to chemicals such as PDMS is pushed against a fine fluid channel by utilizing, for example, air pressure so as to allow the membrane to close the fine fluid channel, thereby controlling the flow of the fluid in a manner to block the flow of the fluid within the fine fluid channel.

A slide gate system has also been developed as a method of mounting a valve to a micro chip, for example, "Low-Leakage Micro Gate Valve" by Albert P. Pisano, et al, Transducers '03, Berkley USA, Jun. 11, 2003, pp. 143-146. In the slide gate system, a member used as a gate is inserted into a fine fluid channel so as to control the fine fluid channel in a manner to block the flow of the fluid within the fine fluid channel.

However, in the valve of the membrane system, the membrane is deformed so as to make it necessary to mount a membrane and provide a space for allowing a deformation of the membrane in the vicinity of the fine fluid channel. It follows that, in the valve of the membrane system, an unduly broad portion in view of the flow of the fluid, which is herein called a dead volume, is generated in the fine fluid channel. Generation of the dead volume brings about a difficulty in the case where different kinds of fluids are consecutively allowed to flow alternately within the fine fluid channel. To be more specific, different kinds of fluids are mixed in the dead volume before the fluid staying in the dead volume is replaced by another fluid that is newly allowed to flow through the fine fluid channel so as to cause the contamination. It should also be noted that when the membrane is deformed so as to close the fine fluid channel, the liquid within the fine fluid channel is caused to flow out of the fine fluid channel. Alternatively, when the membrane is deformed so as to open the fine fluid channel, it is possible for the flow within the fine fluid channel to be pulled backward so as to make it difficult to control the flow within the fine fluid channel.

On the other hand, in the valve of the slide gate system, a clearance is formed in the slide portion of the gate. Since the fluid enters the clearance, it is possible to bring about the contamination in the case of allowing different kinds of liquid materials to flow through the fine fluid channel.

BRIEF SUMMARY OF THE INVENTION

An object of the present invention is to provide a slide valve apparatus that permits preventing the fluid leakage in the slide portion and a method of manufacturing the slide valve apparatus.

According to an aspect of the present invention, there is provided a slide valve apparatus, comprising:

a first member having a first fluid channel configured to flow a fluid, and having a first surface;

a second member, having a second surface, which includes a second fluid channel configured to flow the fluid; and a first elastic membrane formed on the first surface and having a first communicating hole communicating with the first fluid channel, the second surface and the first elastic membrane sliding relative to each other and being so positioned as to communicate the first fluid channel to the second fluid channel through the first communicating hole.

According to an aspect of the present invention, there is provided a slide valve apparatus, comprising:

a first member having a first fluid channel configured to flow a fluid, and having a first surface;

a second member, having a second surface, which includes a second fluid channel configured to flow a fluid; and a first elastic membrane formed on the second sliding surface and having a first communicating hole communicating with the first fluid channel, the first surface and the first elastic membrane sliding relative to each other and being so positioned as to communicate the first fluid channel to the second fluid channel through the first communicating hole.

Further, according to an aspect of the present invention, there is provided a method of manufacturing a slide valve apparatus, comprising:

forming an elastic membrane on a surface of a first member, the first member having a first fluid channel along which flows a fluid and the surface having an opening communicating with the first fluid channel, and baking the elastic membrane, flowing a gas through the first fluid channel and spurting the gas from the opening in a predetermined period during the forming of the elastic membrane or the baking of the elastic membrane.

BRIEF DESCRIPTION OF THE SEVERAL VIEWS OF THE DRAWING

FIG. 7 is an oblique view schematically showing the first member for explaining the coating step for coating the first member with a top coat material, i.e., the coating step included in the manufacturing process of the slide valve apparatus shown in FIG. 6;

FIG. 8 is a lateral cross sectional view schematically showing the first member for explaining the coating step for coating the first member with a top coat material, i.e., the coating step included in the manufacturing process of the slide valve apparatus shown in FIG. 6;

DETAILED DESCRIPTION OF THE INVENTION

Figure 1:
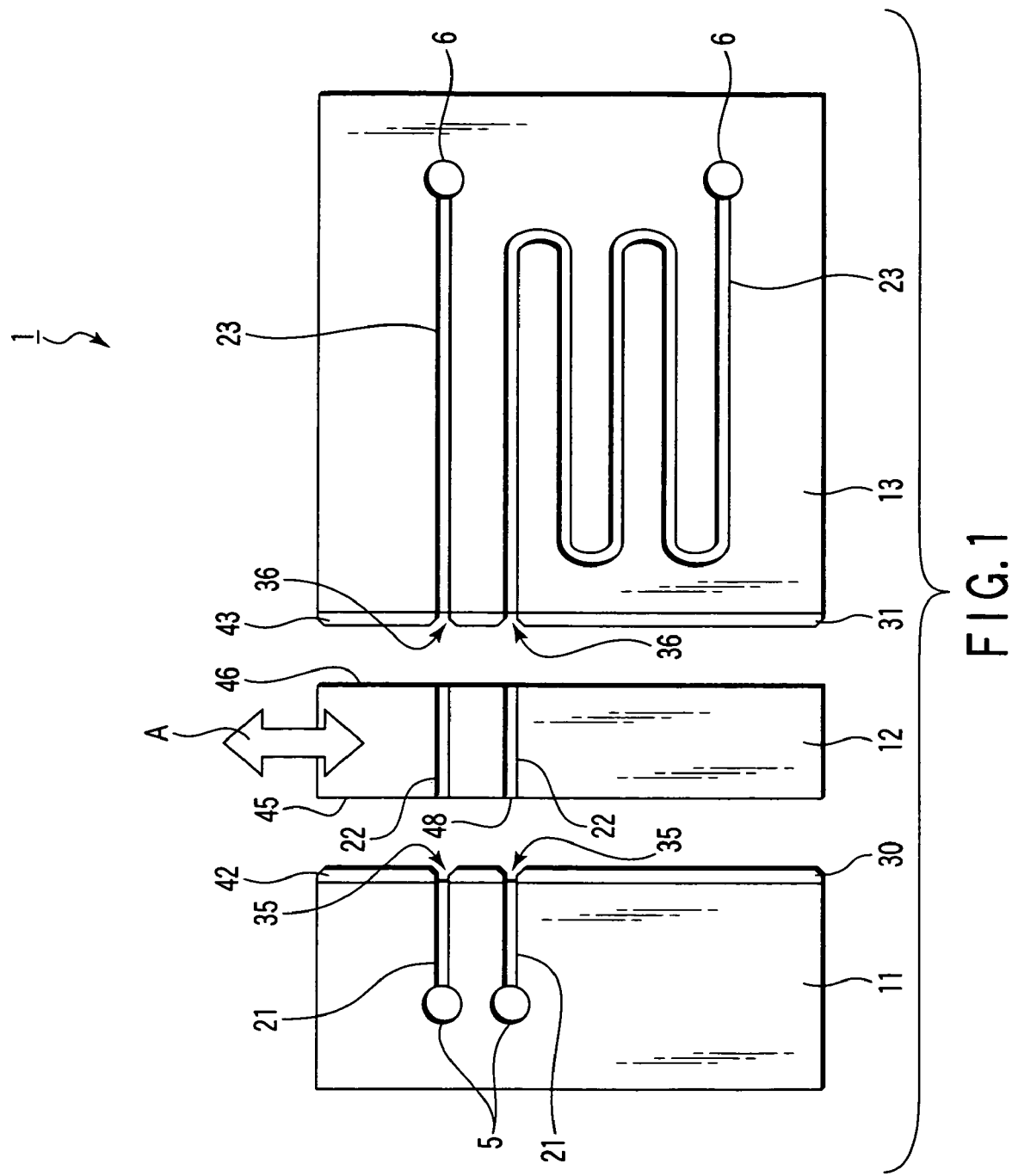
FIG. 1 is a perspective plan view showing in a partly dismantled fashion the inner structure of a slide valve apparatus according to one embodiment of the present invention.

A slide valve apparatus according to an embodiment of the present invention will now be described in detail with reference to the accompanying drawings. In the accompanying drawings, the same or similar members of the apparatus are denoted by the same or similar reference numerals. It should be noted that the accompanying drawings simply show schematically the construction of the slide valve apparatus of the present invention, and thus, the ratios in size differ from those of the actual apparatus. Naturally, the specific size, etc. of the apparatus should be interpreted with reference to the description given below. Of course, the following description includes portions where the relations in size among the accompanying drawings and the ratio differ from those in the actual apparatus.

(Construction of Slide Valve Apparatus)

FIG. 1 schematically shows the construction of a slide valve apparatus 1 according to one embodiment of the present invention. As shown in FIG. 1, the slide valve apparatus 1 comprises a first member 11 having a first fine fluid channel 21 for allowing a fluid to flow therethrough, a second member 12 having a second fine fluid channel 22 arranged in a manner to communicate with the first fine fluid channel 21, and an elastic membrane 30 arranged in the sliding surface between the first member 11 and the second member 12 and including a communicating hole 35 communicating with the first fine fluid channel 21. The first member 11 and the second member 12 are moved relative to each other so as to permit the first fine fluid channel 21 to communicate with the second fine fluid channel 22. Also, the flow of the fluid flowing within the first fine fluid channel 21 is stopped by the sliding surface of the second member 12 along which slides the first member 11, i.e., by a cut surface 45. The slide valve apparatus 1 also comprises the second member 12 having the second fine fluid channel 22 through which flows the fluid, a third member 13 sliding along the second member 12 and having a third fine fluid channel 23 arranged to communicate with the second fine fluid channel 22, and an elastic membrane 31 formed on that surface of the third member 13 along which slides the second member 12 and having a communicating hole 36 communicating with the third fine fluid channel 23. The second member 12 and the third member 13 are moved relative to each other so as to permit the second fine fluid channel 22 to communicate with the third fine fluid channel 23. Also, the flow of the fluid flowing within the second fine fluid channel 22 is stopped by the sliding surface of the third member 13 along which slides the second member 12, i.e., stopped by the surface of the elastic membrane 31 formed on the third member 13.

The entire slide valve apparatus 1 shown in FIG. 1 has a size on the order of about several millimeters to scores of millimeters and provides a so-called "micro chip". It is possible to use, for example, a glass material such as quartz or borosilicate glass, a silicone rubber such as polydimethyl siloxane (PDMS) or an acrylic resin such as polymethyl methacrylate for forming each of the first member 11, the second member 12 and the third member 13. Further, each of the first member 11, the second member 12 and the third member 13 has a double layer structure. It is desirable to use a transparent glass material that transmits the light rays for forming the upper layer of the double layer structure. On the other hand, a metal material having a good workability and also having a high resistance to chemicals such as PEEK (polyether ether ketone), silicon or stainless steel is used for forming the lower layer of the double layer structure. It is also possible to use a metal material that is opaque as a whole such as PEEK (polyether ether ketone), silicon or stainless steel for forming the lower layer of the double layer structure.

A sample introducing port 5 communicating with the first fine fluid channel 21 is formed in the first member 11, the second fine fluid channel 22 is formed in the second member 12, and a sample introducing port 6 communicating with the third fine fluid channel 23 is formed in the third member 13. It is desirable for the fine fluid channel to have a width and height of several microns to hundreds of microns, though it is conceivable for the fine fluid channel to have a width and height smaller than several microns and larger than hundreds of microns. The first member 11, the second member 12 and the third member 13 are moved relative to each other along the elastic membranes 30, 31 providing the sliding surfaces in the sliding directions of the cut surfaces 45, 46 of the second member 12 as denoted by an arrow A in FIG. 1. As a result, the first fine fluid channel 21 and the second fine fluid channel 22 are allowed be separated from each other or to communicate with each other. Likewise, the second fine fluid channel 22 and the third fine fluid channel 23 are allowed to be separated from each other or to communicate with each other. Where the first fine fluid channel 21, the second fine fluid channel 22 and the third fine fluid channel 23 are allowed to communicate with each other, the sample introduced from the sample introducing port 5 passes through the first fine fluid channel 21, the second fine fluid channel 22 and the third fine fluid channel 23 so as to be discharged to the outside through the sample introducing port 6.

Where the first fine fluid channel 21 is separated from the second fine fluid channel 22, the sample introduced from the sample introducing port 5 passes through the first fine fluid channel 21. However, the flow of the sample is stopped by the cut surface 45 of the second member 22 along which slides the elastic membrane 30. Also, where the second fine fluid channel 22 is separated from the third fine fluid channel 23, the flow of the sample passing through the second fine fluid channel 22 is stopped by the side surface portion of the third member 13, i.e., by the surface of the elastic membrane 31 formed on the side surface of the third member 13. Since the first member 11, the second member 12 and the third member 13 perform the sliding movement, it is possible for these members 11, 12 and 13 to play the role of a slide valve, i.e., a micro valve, which stops the flow of the fluid.

Since the first member 11, the second member 12 and the third member 13 are moved relative to each other in the directions denoted by the arrow A as described above, the first fine fluid channel 21, the second fine fluid channel 22 and the third fine fluid channel 23 are separated from each other or allowed to communicate with each other so as to control the flow of the fluid within the fine fluid channels.

Figure 2:
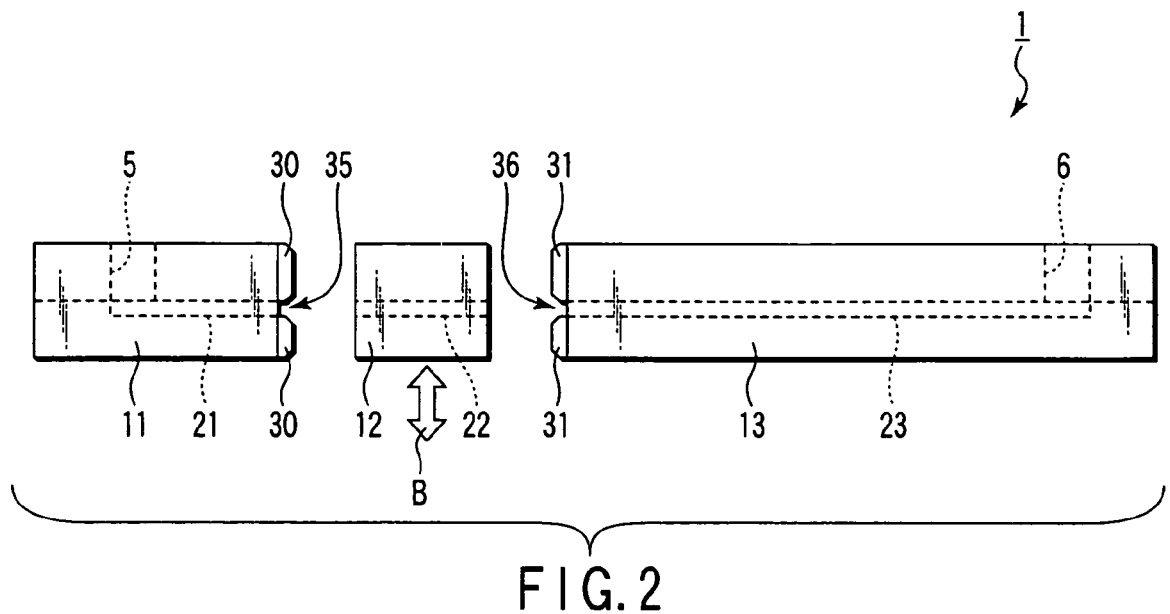
FIG. 2 is a lateral cross sectional view schematically showing in a dismantled fashion the inner structure of the slide valve apparatus shown in FIG. 1.

FIG. 2 is a cross sectional view in the long side direction of the slide valve apparatus 1 shown in FIG. 1. As described above, the first member 11, etc. performs the slide movement in the directions denoted by the arrow A in FIG. 1. However, it is also possible for the first member 11, etc. to perform the slide movement in the directions denoted by an arrow B in FIG. 2. Even in this case, the first fine fluid channel 21, the second fine fluid channel 22 and the third fine fluid channel 23 can be separated from each other or are allowed to communicate with each other so as to control the flow of the fluid within the fine fluid channels.

Figure 3:
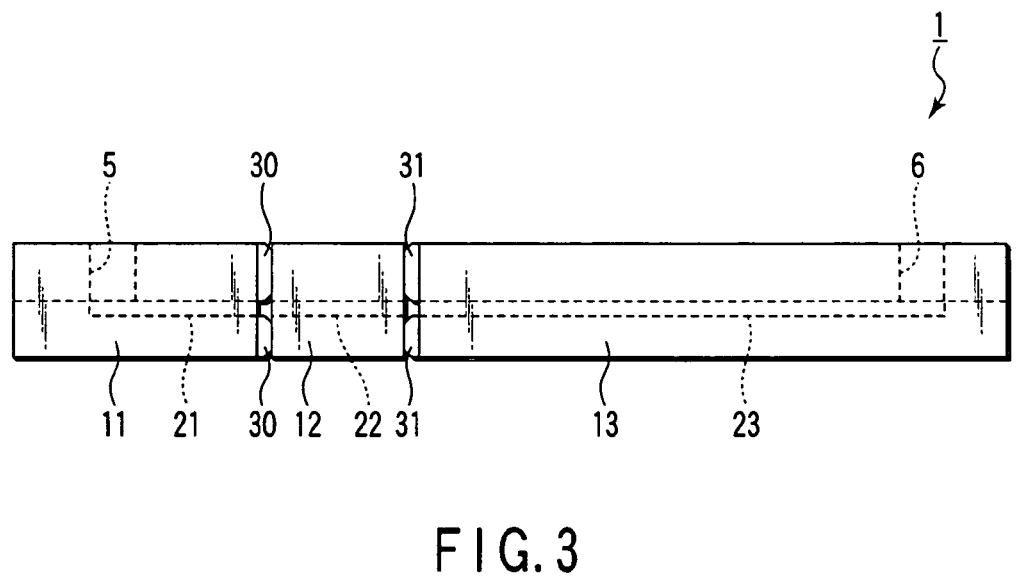
FIG. 3 is a side view schematically showing the inner structure of the slide valve apparatus shown in FIG. 1.

Incidentally, FIGS. 1 and 2 show the first member 11, the second member 12 and the third member 13 which are positioned apart from each other. However, these first, second and third members are connected to each other with the elastic membranes 30 and 31 interposed therebetween, as shown in FIG. 3. It should also be noted that, if the second member 12 is formed circular, and if the first and third members 11, 13 are formed to have curved surfaces conforming with the circumferential side surface of the second member 12, it is possible to rotate the second member 12 so as to control the flow of the fluid within the fine fluid channels.

In the above embodiment, the elastic membranes 30 and 31 are provided on the side surfaces of the first and third members 11. However, in an alternative embodiment, the elastic membranes 30 and 31 may be provided on the both side surfaces of the second member 12 or the elastic membranes 30 and 31 may be provided on not only the side surfaces of the first and third members 11, 13 and also on the both side surfaces of the second member 12. In the alternative embodiment, the elastic membranes 30 and 31 also may have the communicating holes 35, 36 communicating with the fine fluid channel 22.

(Function of Elastic Membrane Included in the Slide Valve)

As described above, the slide valve apparatus 1 shown in FIGS. 1 and 2 comprise the elastic membranes 30, 31 each formed of an elastic body. These elastic membranes 30, 31 are formed on the cut surfaces 42, 43 of the first member 11 and the third member 13, respectively, along which slides the second member 12.

Where the first member 11, the second member 12 and the third member 13 shown in FIG. 1 are formed of a brittle material such as glass, a limit is reached in the degree of decreasing the clearance among the first member 11, the second member 12 and the third member 13 when it is intended to suppress the leakage of the fluid. Naturally, it is possible for a slight leakage of fluid to be generated or for a cross contamination among the liquid channels to be derived from the liquid leakage. Such being the situation, the elastic membrane 30 is formed on the cut surface 42 of the first member 11 along which slides the second member 12, and the elastic membrane 31 is formed on the cut surface 43 of the third member 11 along which slides the second member 12. It should also be noted that the first member 11 and the second member 12 are brought into contact with each other with a prescribed contact pressure imparted therebetween. Likewise, the third member 13 and the second member 12 are brought into contact with each other with a prescribed contact pressure imparted therebetween. As a result, the elastic membranes 30, 31 formed on the first member 11 and the third member 13, respectively, are crushed by the contact pressure so as to achieve the sealing between the first member 11 and the second member 12 and between the second member 12 and the third member 13, thereby suppressing the liquid leakage as much as possible.

It is desirable for each of the elastic membranes 30 and 31 to be formed of a material having a high resistance to chemicals and also having a high resistance to heat. For example, it is desirable for each of the elastic membranes 30 and 31 to be formed of a fluoroplastic material such as PTFE (polytetrafluoro ethylene), PFA (perfluoroalkoxy) or ETFE (ethylene tetrafluoro ethylene).

With decrease in the thickness of the elastic membrane 30 (31), decreased is the amount of deformation of the elastic membrane 30 in the pressurized direction when the elastic membrane 30 is crushed by the contact pressure between the first member 11 and the second member 12. Such being the situation, the possibility of a fine gap formation on the sliding surface, i.e., the surface of the elastic membrane 30, is increased, with the result that the liquid leakage tends to be brought about easily and the pressure resistance is also lowered.

Also, with decrease in the thickness of the elastic membranes 30, 31, pin holes tend to be formed easily on surface of the elastic membrane with a higher probability. Such being the situation, where the elastic membranes 30, 31 are intended to perform the function of allowing the first member 11 and the third member 13, on which are formed the elastic membranes 30, 31, to be resistant to chemicals, it is possible for the first member 11 and the third member 13 to be corroded by the chemicals permeating through the pin holes formed in the elastic membranes 30, 31.

On the other hand, if the elastic membranes 30, 31 are unduly thick, it is possible for the fluid channels 21, 23 to be closed by the material of the elastic membranes 30, 31 in the step of forming the elastic membranes 30, 31 so as to lower the yield. Also, the communicating holes 35, 36 communicating with the fine fluid channels 21, 23, respectively, are tapered. If the elastic membranes 30, 31 are unduly thick, the tapering of the communicating holes 35, 36 communicating with the fine fluid channels 21, 23, respectively, is rendered large. It follows that a large dead volume is formed in each of the communicating portion between the large tapered section of the communicating hole 35 and the fine fluid channel 22 of the second member 12 and between the large tapered section of the communicating hole 36 and the fine fluid channel 22 of the second member 12. Further, if the elastic membranes 30, 31 are unduly thick, the elastic membranes 30, 31 tend to be peeled when the elastic membranes 30, 31 are slid along the cut surfaces of the second member 12.

Under the circumstances, the thickness of each of the elastic membranes 30, 31 is set at 10 μm to 100 μm. In this embodiment of the present invention, the thickness of each of the elastic membranes 30, 31 is set at 40 μm. In this case, the thickness of each of the elastic membranes 30, 31 is caused to fall within a range of 15 μm to 65 μm because the polishing apparatus used nowadays for polishing the surface of the elastic membranes 30, 31 in the polishing step described herein later has about ±20 μm of the polishing no uniformity. It should be noted, however, that the amount of deformation of the elastic membranes 30, 31 is changed depending on the elasticity modulus of the material used for forming the elastic membranes 30, 31, on the thickness of the elastic membranes formed, and on the holding pressure. Also, the required amount of deformation is changed depending on the surface accuracy of the cut surfaces 42, 43 of the first member 11 and the third member 13 on which the elastic membranes 30, 31 are formed, i.e., the surface accuracy such as the degree of perpendicularity in the vertical direction, the degree of perpendicularity in the lateral direction and the degree of planar flatness, and also depending on the planar accuracy of the cut surfaces 45, 46 of the second member 12 along which slide the elastic membranes 30, 31, i.e., the planar accuracy such as the degree of perpendicularity in the vertical direction, the degree of perpendicularity in the lateral direction and the degree of planar flatness.

Figure 4:
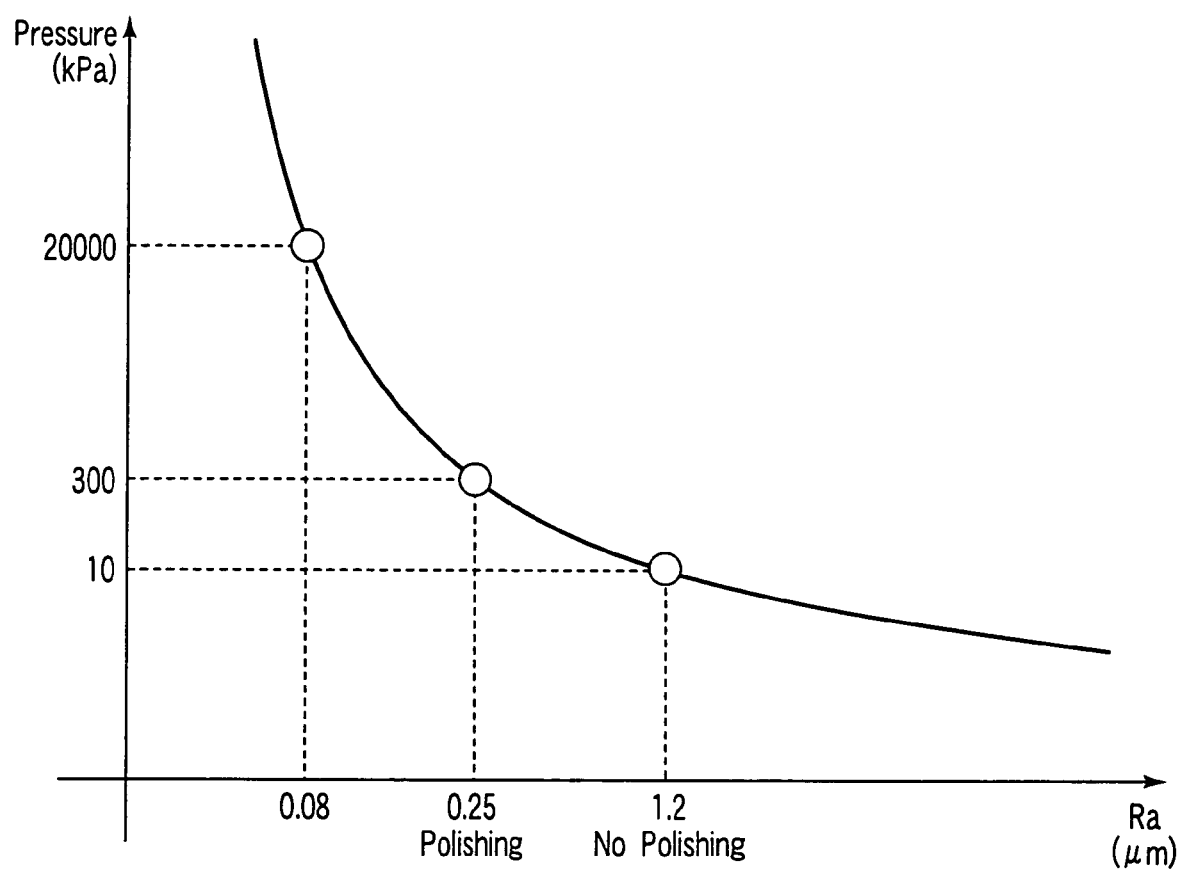
FIG. 4 is a graph showing the pressure resistance of the slide valve apparatus shown in FIGS. 1 to 3 depending on the polishing on the surface of the membrane layer.

Also, in the elastic membranes 30, 31, it is desirable for the surface roughness of the elastic membrane to satisfy the condition of Ra<0.25 μm, where Ra denotes the arithmetic average roughness, because the leaking amount of the liquid material is decreased with decrease in the surface roughness in the sliding portion. Incidentally, in the experiment to measure the pressure resistance performance under the pressure of 300 kPa with a pure water used as the operating fluid, the water leakage is generated under the condition of Ra>1.2 μm (no polishing). However, the water leakage is not generated under the condition of Ra<0.25 μm (polished). Further, it is preferable that the surface roughness of the elastic membrane to satisfy the condition of Ra<0.08 μm. In this condition, the water leakage is prevented from being generated under the pressure of 20000 kPa. Incidentally, the threshold performance at which the leakage is generated is as shown in the graph of FIG. 4, in which the pressure resistance performance is plotted on the ordinate, and the surface roughness (Ra) is plotted on the abscissa.

(Manufacturing Method of Slide Valve Apparatus)

The manufacturing method of the slide valve apparatus 1 shown in FIGS. 1 to 3 will now be described with reference to FIGS. 5A to 8.

Figure 5A:
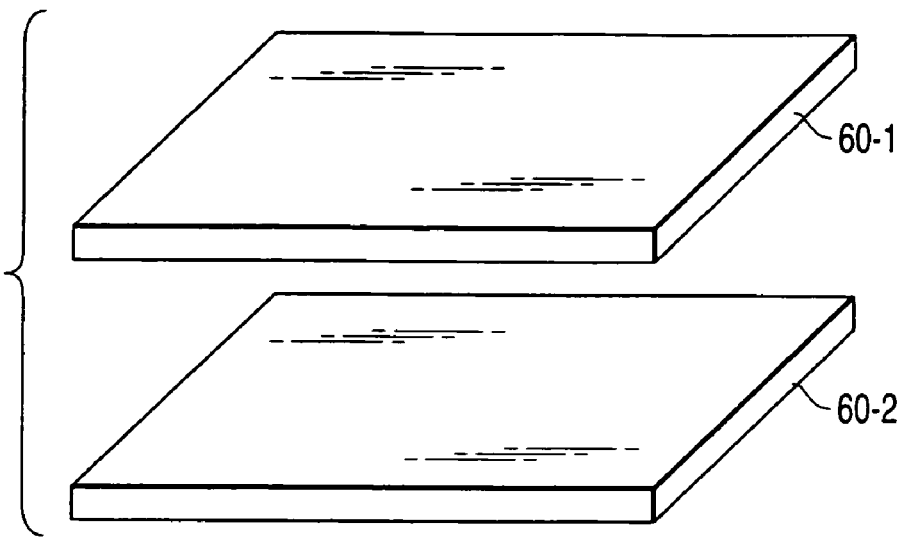
FIGS. 5A to 5F are schematic views showing the manufacturing process of the slide valve apparatus shown in FIGS. 1 to 3.

In the manufacturing method of the slide valve apparatus 1, there is prepared two base bodies which are used as a material of the micro chip and corresponds to upper and lower plates 60-1, 60-2, as shown in FIG. 5A. A glass material is used in many cases as the material of the base body 60-1, 60-2. However, it is also possible to use a plastic material. It is desirable for the base body 60-1, 60-2 to have a polishing treatment applied in advance to the bonding surface because the base body 60-1, 60-2 is subjected later to a bonding process. Also, it is desirable for a polishing treatment to be applied in advance to that surface of the base body 60-1, 60-2 through which passes light rays in order to detect, for example, a chemical change in the micro chip by using a light beam.

Figure 5B:
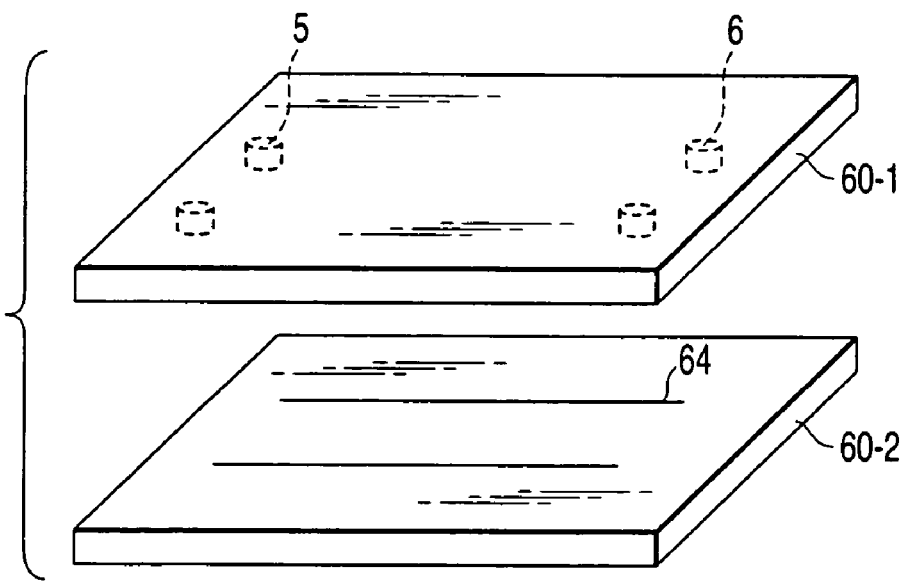

Next, formed in the upper plate 60-1 are holes 5, 6 for introducing chemicals used for the chemical reaction into the chip and for discharging the waste solution after the reaction, as shown in FIG. 5B. It is possible to employ the machining utilizing a drill, the molding, the molding, the press work or the sandblasting for forming the holes 5, 6. Fine fluid channels (grooves) 64 are also formed in the lower plate 60-2, as shown in FIG. 5B. The grooving 64 can be performed by an etching method utilizing the masking. It is also possible to employ the sandblasting, the machining utilizing a drill, the press work or the molding for forming the grooves 64.

Figure 5C:
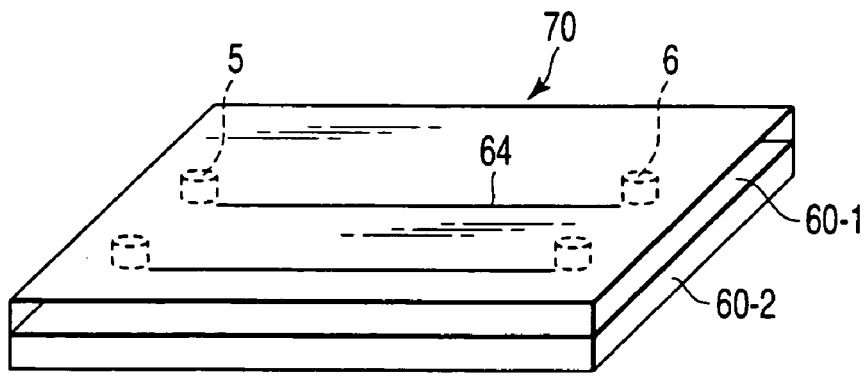
Figure 5D:
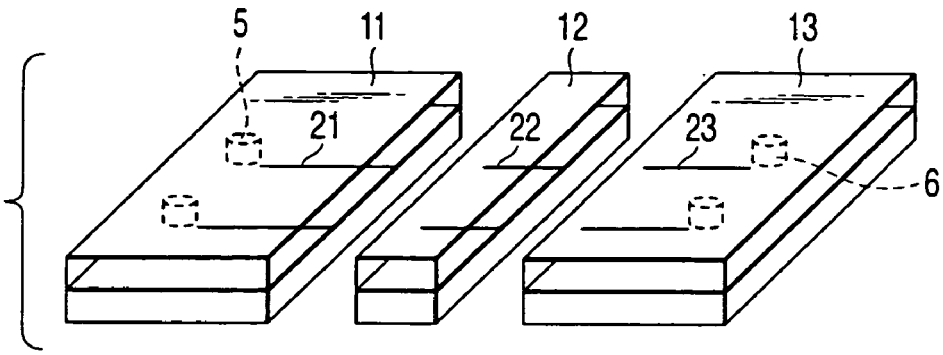
Figure 5E:
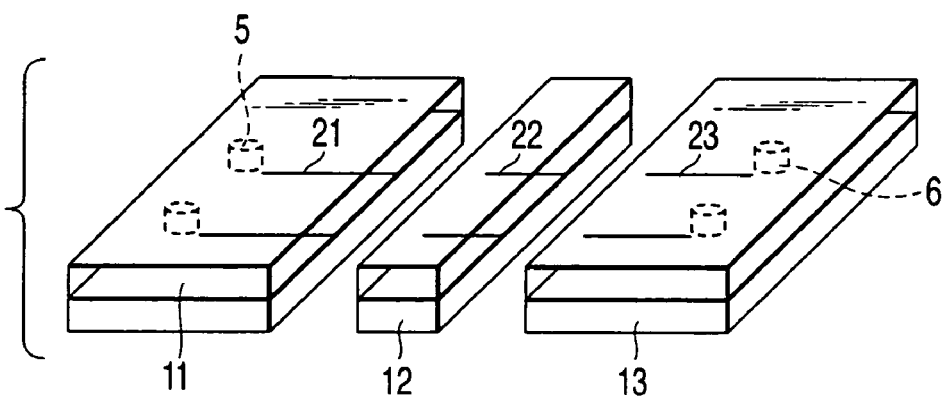
Figure 5F:
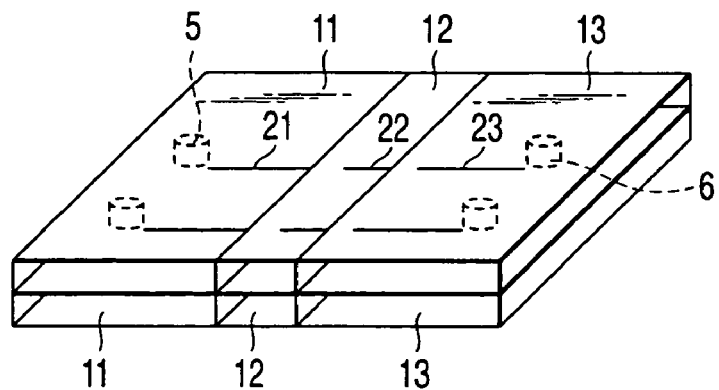

The bonding process for bonding the upper plate 60-1 to the lower plate 60-2 to form a micro chip unit or substrate 70 is performed after the perforating and grooving processes, as shown in FIG. 5C. Employed in the bonding process in many cases is a thermal fusion in which the bonding surfaces are bonded under the state of a high temperature without using an adhesive in view of the problem such as the resistance to chemicals. The bonding method using an adhesive can be employed in the case where the resistance to chemicals need not be worried about.

In the next step, the micro chip unit or substrate 70 is partly cut in parallel so as to make it possible to carry out the slide driving and, then, a polishing treatment is applied to the edge surface of the members 11, 12, 13. In the cutting or polishing process, it is necessary to process the member 11, 12, 13 which is driven (slid) in parallel to be parallel as much as possible.

In the further next step, a membrane is formed on the sliding surface of the member 11, 12, 13 that is driven (slid), as described later. The membrane can be formed on the both sliding surfaces of the member 11, 12, 13 or on one sliding surface alone of the member 11, 12, 13. A polishing treatment is applied as required to the membrane-forming surface after formation of the membrane so as to improve the adhesiveness of the sliding surface.

Finally, the stationary member or members 11, 12, 13 and the slide driving member or members 11, 12, 13 are combined by arranging in parallel. The combining method includes the method of bonding the stationary member or members 11, 12, 13 to another base body, the method of incorporating the stationary member or members 11, 12, 13 and the driving member or members 11, 12, 13 in parallel into an exclusive holder so as to have the stationary member and the driving member held by the exclusive holder, and the method of incorporating the stationary member and the driving member into a driving apparatus.

In the example given above, a micro chip is prepared by bonding two base bodies. However, a similar processing can be applied to a multi-layered micro chip prepared by bonding three or more base bodies.

Also, in the example given above, a perforating treatment of forming the holes is applied to the upper plate and a grooving treatment is applied to the lower plate. However, it is also possible to apply both the perforating treatment and the grooving treatment to the upper plate, followed by bonding the upper plate to the lower plate.

As described above, the micro chip unit or substrate 70 having a fine fluid channel formed therein is cut in parallel first so as to prepare the first member 11, the second member 12 and the third member 13. It is conceivable to employ a dicing method or to use a wire saw for cutting the substrate. In order to improve the mass productivity of the slide valve apparatus 1, it is desirable to employ a multi-cut method using a plurality of blades or a wire. The edge surface is polished in parallel. As the polishing method, it is conceivable to employ the lapping or polishing on one or both of the surfaces. In view of the parallelism of the edge surfaces, it is desirable to employ the lapping on the both surfaces as the polishing method. In this fashion, the substrate is partitioned into the first member 11, the second member 12 and the third member 13. Then, the elastic membranes 30, 31 are formed on the cut surface 42 of the first member 11 and on the cut surface 43 of the third member 13. Incidentally, the membrane-forming step described in the following covers the case of forming the elastic membrane 30 on the first member 11. Naturally, the elastic membrane 31 can also be formed by the similar membrane-forming procedure on the third member 13.

There will be described steps of the membrane-forming process described above with reference to FIG. 6.

Figure 6:
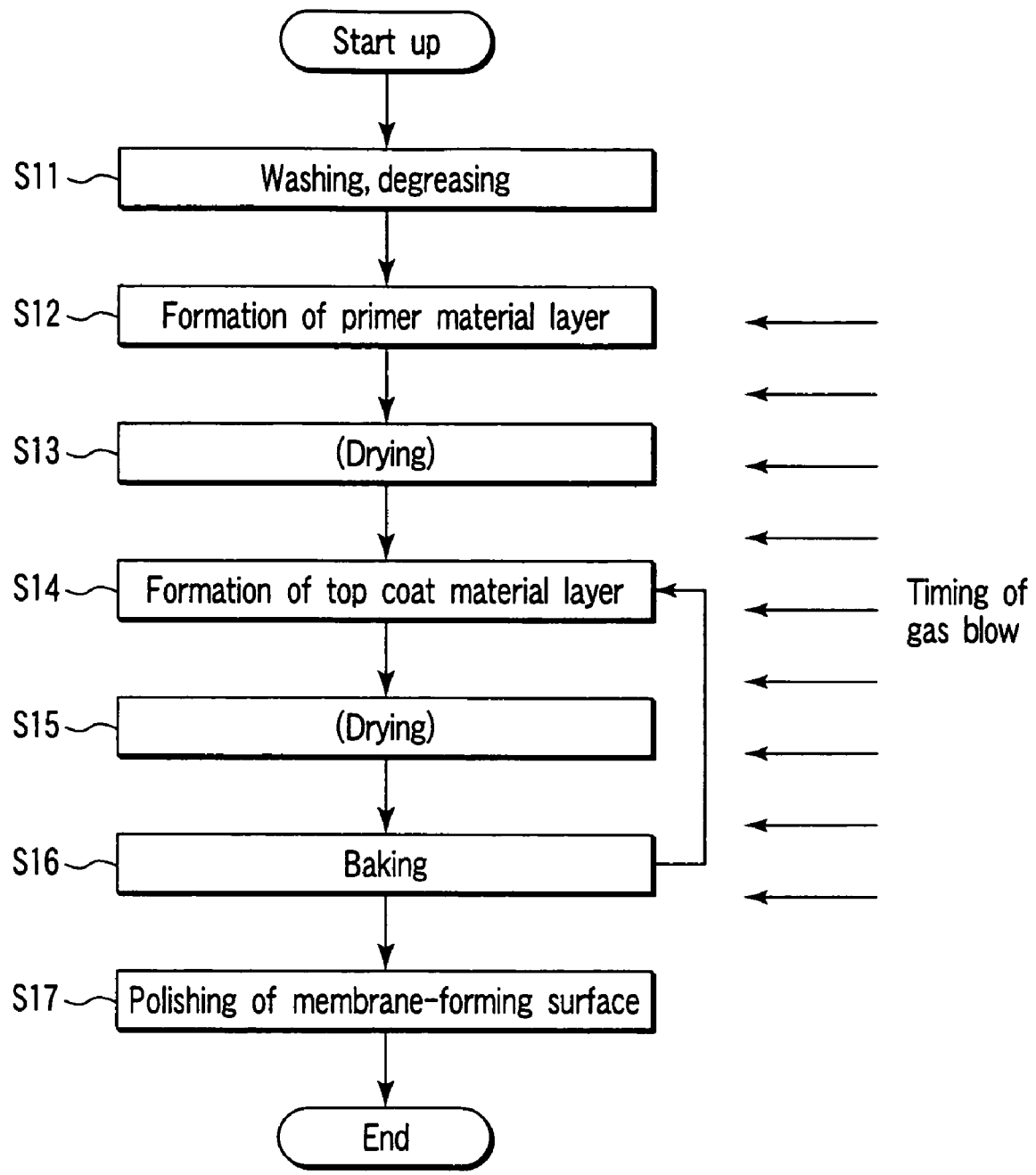
FIG. 6 is a flow chart showing the manufacturing process of the slide valve apparatus shown in FIGS. 1 to 3.

In step S11 of the membrane-forming process shown in FIG. 6, cleaning treatment is applied first to the cut surface 42 of the first member 11 to which is exposed the edge portion 41, which is an open edge, of the fine fluid channel 21. The cleaning may include not only a washing but also a degreasing. That is, the cut surface 42 is washed with purified water or carbonated water to remove chips produced in a cutting process and then is degreased by organic solvent or acid to remove organic matters. As a result, it is possible to remove the dust and grease from the cut surface 42 so as to make it possible to prevent the peeling of the membrane layer, i.e., the peeling caused by the attachment of the dust or grease.

Then, in step S12, the cut surface 42 is coated with a primer material by the spray coating method so as to improve the adhesiveness between the cut surface 42 and a top coat material. Also, in the subsequent top coat processing stage, the primer material is dried in step S13 before the coating step with a liquid top coat material.

After the primer material is dried, the cut surface 42 to which is applied the primer material is coated with a top coat material by the spray coating method, followed by drying the top coat material in step S15. In the case of this embodiment, the spray coating method for spraying a liquid primer material or a top coat material against the cut surface 42 of the first member 11 as shown in FIG. 7 is employed as the method of forming the primer material in step S12 and as the method of forming the top coat material in step S14.

The spray coating method will now be described in detail with reference to the case of applying a spray coating method of a top coat material, which is taken up as an example. In the cut surface 42 on which is formed the top coat material, the edge section 41 of the fine fluid channel 21 is exposed. In this case, it is necessary to prevent the edge section 41 from being covered with the top coat material. It is also necessary to prevent the top coat material from entering the edge section 41. Such being the situation, the cut surface 42 is coated with the top coat material while blowing a gas from the sample introducing port 5, which is the other edge section communicating with the edge section 41 of the fine fluid channel 21 formed in the first member 11, into the fine fluid channel 21.

To be more specific, a liquid top coat material is sprayed against the cut surface 42 by using a sprayer 50 equipped with a nozzle while blowing a gas from the sample introducing port 5, which is the other edge section of the fine fluid channel 21 formed in the first member 11, as shown in FIG. 8. In this case, it is necessary for the spraying direction to be inclined relative to the cut surface 42 in order to prevent the spraying of the top coat material from being obstructed by the gas blown from the edge section 41 of the fine fluid channel 21. If the spraying angle θ of the top coat material is increased, the top coat material is scattered so as to lower the coating efficiency. To be more specific, it is desirable for the spraying angle θ to be set at 45±30° relative to the forming direction of the fine fluid channel 21. Also, if the top coat material is sprayed oblique, the thickness of the formed film is made small in a portion 44. In order to prevent the no uniformity in the thickness of the formed film, the top coat material is sprayed by rotating the sprayer 50 while setting the sight of the sprayer 50 on the edge section 41, thereby forming the elastic membrane 30 having a uniform thickness.

Incidentally, the membrane-forming method utilizing the gas blow described above is effective not only in the coating process of the top coat material in step S14 but also in the coating process of the primer material in step S12. If the coating of the primer material and the coating of the top coat material are carried out while blowing a gas in the coating process of the primer material and in the coating process of the top coat material, it is possible to prevent the primer material and the top coat material from entering the fine fluid channel 21. Particularly, where the coating material is coated under the state of a liquid material as in the spray coating, it is certainly possible to remove, for example, the coating material from the fine fluid channel 21 by the blow of a gas after the coating operation. However, if the coating material is once brought into contact with the wall of the fine fluid channel 21, a chemical function is performed on the wall of the fine fluid channel 21 so as to corrode possibly the surface of the fine fluid channel, thereby changing the surface properties. Such being the situation, in this embodiment of the present invention, a gas is blown in the coating process of the primer material and the top coat material so as to prevent the coating material from entering the fine fluid channel 21.

Further, the communicating hole 35 communicating with the fine fluid channel 21 is formed in the elastic membrane 30 formed as described above on the cut surface 42 of the first member 11.

After formation of the communicating hole 35, the first member 11 having the top coat material layer formed thereon is put in a furnace so as to apply a baking treatment to the first member 11 in step S16 under a high temperature of about 400° C. Incidentally, the thickness of the top coat material layer can be controlled by controlling the sprayed amounts of the primer material and the top coat material. However, since the thickness of the membrane that can be processed by a single baking treatment is limited, the thickness of the elastic membrane can be increased by repeating the top coat formation, the drying and the baking process in steps S14 to S16.

As described above, the primer material and the top coat material can be baked to the cut surface 42 of the first member 11 by the baking process described above. In this case, however, the primer material and the top coat material are converted into a highly viscous liquid material having fluidity, when heated to a high temperature in the baking step, with the result that it is possible for the molten primer material and the top coat material to enter the fine fluid channel 21. In order to avoid this difficulty, it is advisable to allow the membrane-forming surface to face downward, i.e., to face in the gravitational direction, so as to prevent the primer material and the top coat material from entering the fine fluid channel 21 and, thus, to prevent the fine fluid channel from being plugged.

After completion of the baking process, a polishing treatment is applied to the membrane-forming surface. To be more specific, under the planar accuracy of the membrane-forming surface immediately after the baking treatment, it is possible to bring about the leakage of the fluid flowing within the fine fluid channel 21 under the state that the first member 11 is brought into contact with the second member 12, as described previously in conjunction with FIG. 1. Also, if the contact pressure between the first member 11 and the second member 12 is increased in an attempt to suppress the leakage of the fluid, a large force is required for moving the second member 12. Under the circumstances, in this embodiment of the present invention, a polishing treatment is applied to the surface of the elastic membrane 30 so as to flatten the surface and, thus, to enhance the adhesiveness to the second member 12, thereby suppressing the leakage of the fluid.

Incidentally, if the communicating hole 35 communicating with the fine fluid channel 21 is formed in the membrane-forming surface by employing a gas blow in the coating process of the primer material in step S12 and in the coating process of the top coat material in step S14, the wall surface of the communicating hole 35 is tapered in a manner to expand from the cut surface 42 of the first member 11 toward the membrane-forming surface, i.e., toward the surface of the elastic membrane 30.

The communicating hole 35 surrounded by the tapered region is made larger than the cross sectional shape of the fine fluid channel 21 on the surface of the membrane layer (elastic membrane 30). It should be noted that the cross section of the fine fluid channel 22 formed in the second member 12 is equal in size to the cross section of the fine fluid channel 21 formed in the first member 11. It follows that, when the second member 12 is moved so as to be brought into contact with the first member 11 such that the edge section 41 of the first fine fluid channel 21 formed in the first member 11 is aligned with the edge section 48 of the second fine fluid channel 22 formed in the second member 12, it suffices for the communicating hole 35 having a large cross section, which is formed on the surface of the membrane layer (elastic membrane 30) to be aligned with the edge section 48 having a small cross section of the fine fluid channel 22 formed in the second member 12. Naturally, the communicating hole 35 can be aligned easily with the edge section 48 of the fine fluid channel 22.

Figure 9:
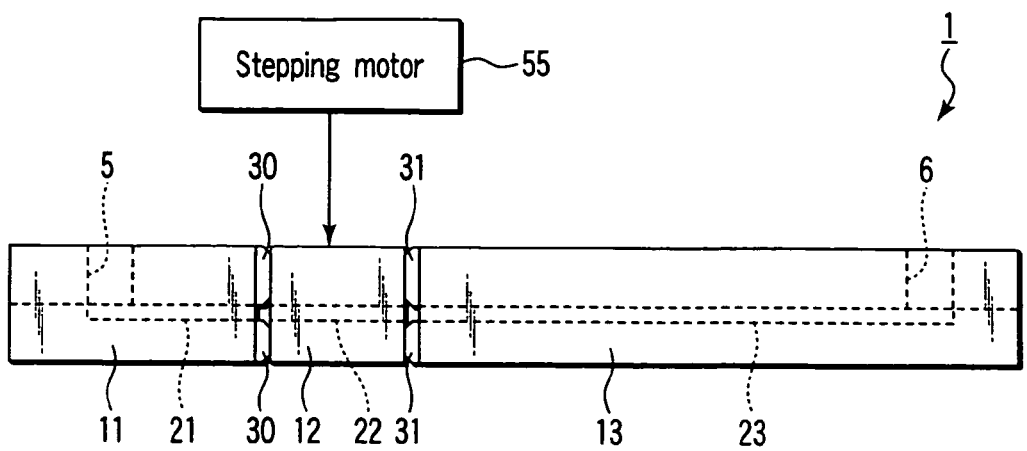
FIG. 9 is a side view schematically showing the inner structure of the slide valve apparatus shown in FIG. 1.

Incidentally, in the case of using the fine fluid channel 21 having a width of about 100 μm, the positioning accuracy of at least about ±5 μm is required for the alignment of the fine fluid channels. In this case, required is the feedback control utilizing in combination an actuator for moving the second member 12 and a position sensor for detecting the position of the second member 12. However, when the tapered communicating hole 35 in this embodiment is aligned with the fine fluid channel 22, it is possible to lower the aligning accuracy. For example, it is possible to carry out an open control by using, for example, a stepping motor 55, as shown in FIG. 9, the open control being simpler than the feedback control.

It should also be noted that, in the case of forming a tapered hole section, i.e., the communicating hole 35, in the membrane layer (elastic membrane 30), the peripheral region of the hole section does not form a convex configuration but forms a smoothly curved configuration, with the result that it is possible to prevent the stress concentration on the peripheral region of the hole section when the second member 12 is slid along the elastic membrane 30. It follows that it is possible to prevent the membrane-forming material from being broken or peeled off partly.

On the other hand, a dead volume is formed in the concave section in a direction differing from the flowing direction of the fine fluid channel 21 in the tapered hole section, i.e., the communicating hole 35. Particularly, where a slide structure is used for the switching of the inner fluid channel, the liquid material resident in the dead volume flows from the dead volume region into the fluid channel after a new liquid material flows out by the switching of the fluid channel, with the result it is possible to bring about the cross contamination. For example, there is a case where it is required for the amount of the cross contamination of the different kind of the fluid accompanying the switching or for a quantitative volume injection to be not larger than 0.5%. In this case, it is necessary for the volume of the dead volume section to be not larger than 0.5% of the amount of the fluid that is to be used.

Figure 10:
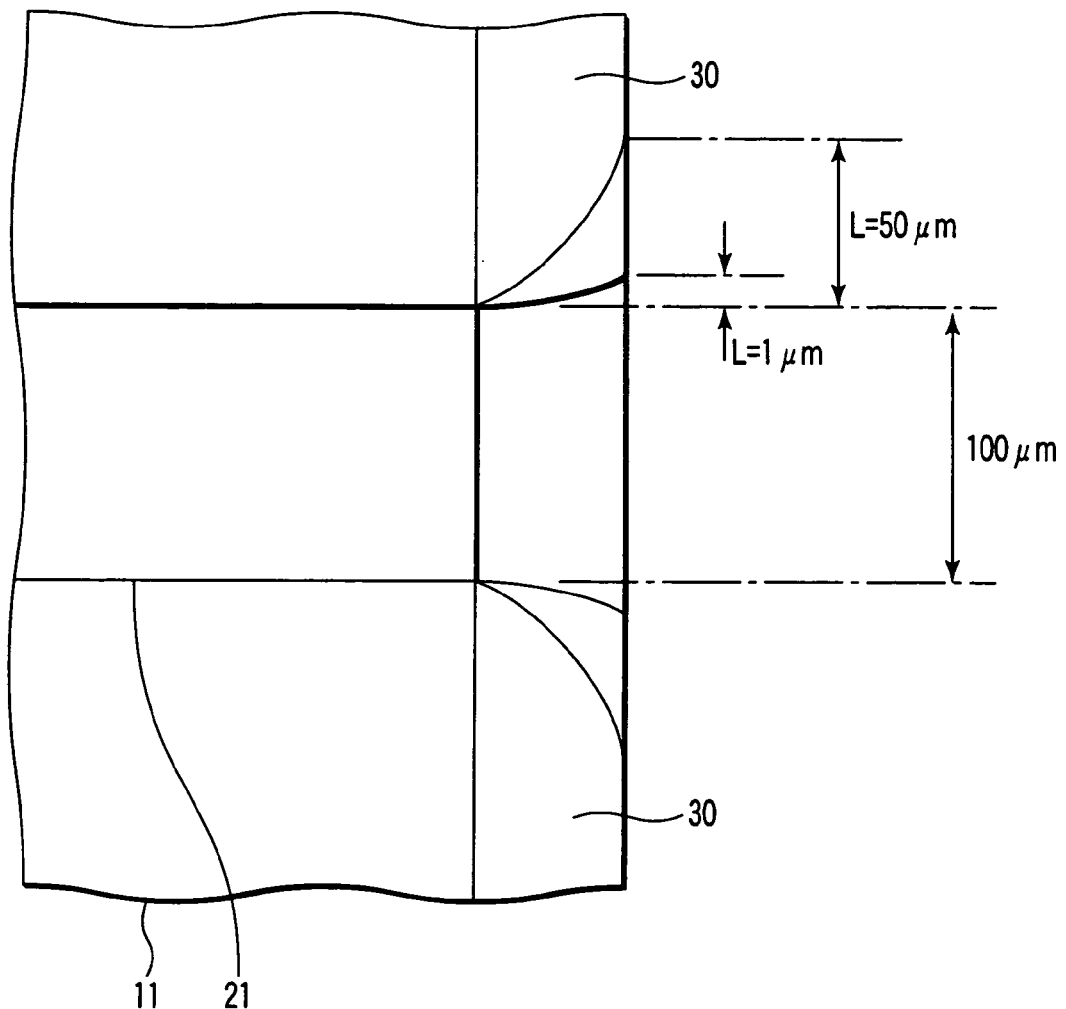
FIG. 10 is a partial plan view showing in a magnified fashion the hole section of the membrane layer included in the slide valve apparatus shown in FIG. 1.

Such being the situation, it is desirable to determine the size of the surface of the membrane layer, i.e., the elastic membrane 30, formed in the tapered hole section, i.e., the communicating hole 35, in view of the facilitation of the position alignment and the avoidance of the breakage and peeling. For example, where an elastic membrane is formed in a thickness of 40 μm relative to the fine fluid channel having a width of 100 μm and a height of 40 μm, it is desirable for the elastic membrane 30 to have an open amount L of at least about 1 μm as shown in FIG. 10. Also, it is desirable for the open amount L noted above to be not larger than 50 μm under the similar conditions in order to suppress the generation of the cross contamination caused by the dead volume.

In the membrane-forming process described above, the spray coating is employed for the coating of the primer material and the top coat material. However, the coating method is not limited to the spray coating method in the present invention. It is also possible to employ, for example, a dip coating method in which the cut surface 42 is dipped in the liquid primer material or the top coat material, a powder coating method, i.e., an electrostatic powder coating method, in which the cut surface 42 is charge negative and a powdery primer material and the top coat material are charged positive so as to permit the primer material and the top coat material to be attached to the cut surface 42, a spin coating method in which a primer material and a top coat material are dripped onto the surface of the substrate while rotating the substrate, or a screen printing method. In the powder coating method, the powdery material is simply under the state of being attached to the membrane-forming surface in the stage before the baking treatment, with the result that the powdery material attached to the edge section 41 of the fine fluid channel 21 can be removed easily by the blowing of a gas so as to form the communicating hole 35 communicating with the fine fluid channel 21.

Further, the membrane-forming process described above is directed to an example of coating a primer material and a top coat material. However, it is also possible to use a denatured material that does not require a primer material and that permits forming the membrane by a single coating treatment so as to make it possible to decrease the number of times of the coating operations and the drying operations.

Also, in the membrane-forming process described above, a gas is blown during the coating operation of the primer material and during the coating operation of the top coat material. However, the gas can be blown as desired during the coating operation of the primer material, after the coating operation of the primer material, during the drying operation of the primer material, after the drying operation of the primer material, during the coating operation of the top coat material, after the coating operation of the top coat material, during the drying operation of the top coat material, after the drying operation of the top coat material, or during the baking treatment so as to form a membrane layer (elastic membrane 30) in the hole section communication with the fine fluid channel 21. It is also possible to blow the gas during the entire process ranging between the coating step of the primer material and the baking step or during a plurality of optional process steps.

In the case of using a fluoroplastic resin as the top coat material, the top coat material is coated in the form of a liquid material by the spray coating method, followed by drying and subsequently baking the sprayed top coat material. In this case, a gas is blown before the baking process against the membrane layer formed by the spray coating method. The gas is blown against the membrane layer formed by the spray coating method after the membrane layer is made powdery by the drying process so as to make it possible to remove easily the powdery top coat material attached to the edge section 41 of the fine fluid channel 21.

Figure 11A:
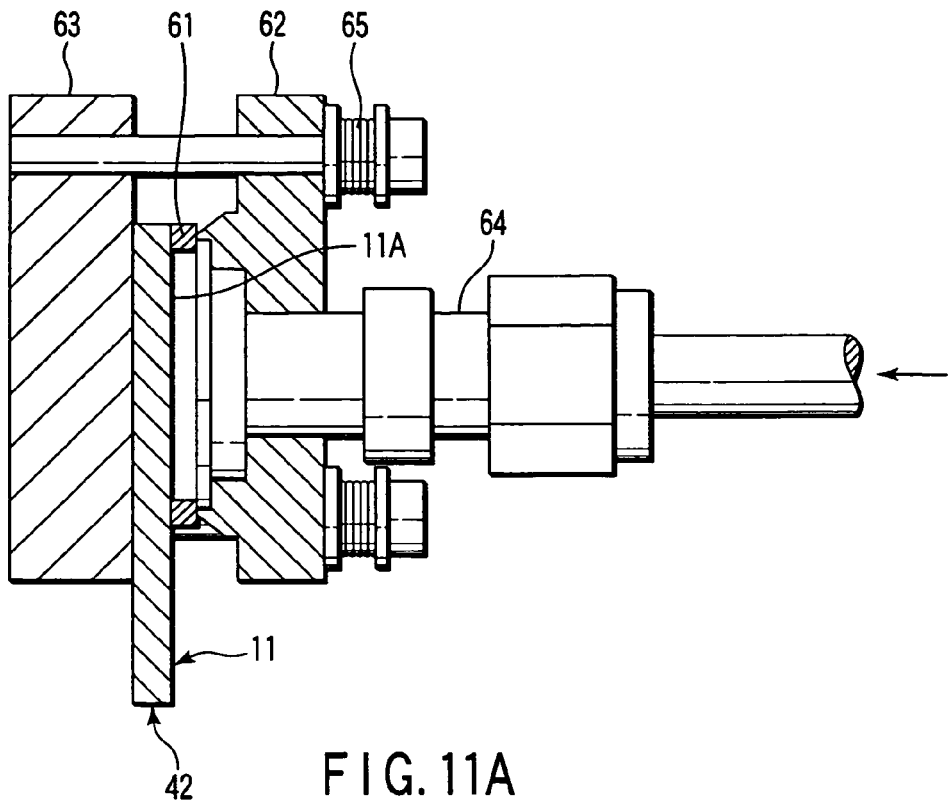
FIGS. 11A and 11B are a side view and a plan view, respectively, each schematically showing the furnace blow tool used in the baking step included in the manufacturing process of the slide valve apparatus shown in FIG. 6.
Figure 11B:
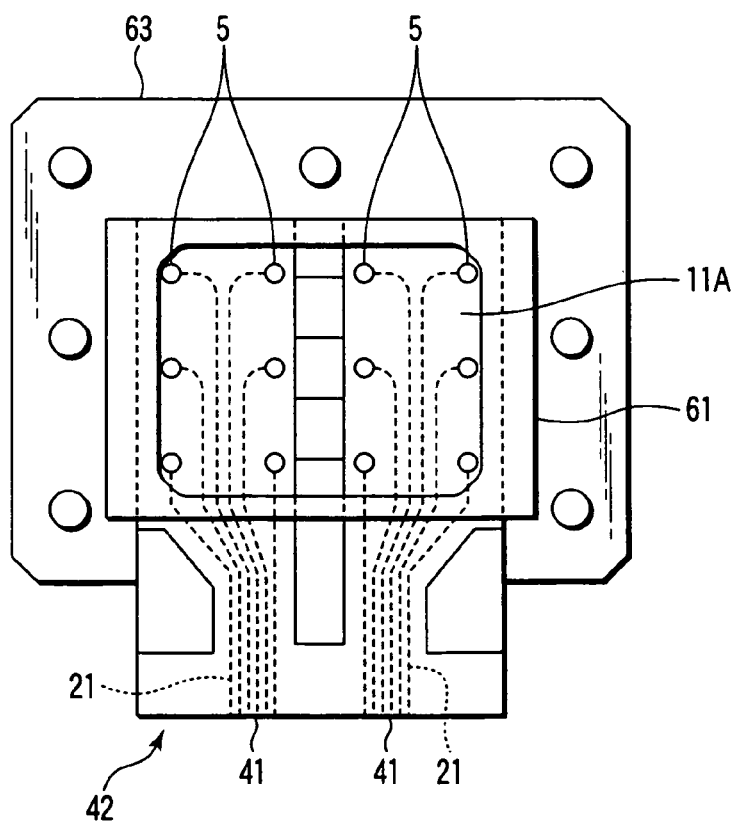

It should also be noted that it is possible for the primer material and the top coat material that are melted under the state of a high temperature to be collected in the communicating hole 35 by the effect of the surface tension so as to close the hole section. However, if a gas is blown during the baking process, it is possible to prevent the communicating hole from being closed.

Where a gas is blown during the baking process, the baking is performed while blowing a gas under the state that the surface 11A of the first member 11 having the sample introducing ports 5 formed therein is fixed to tools 62, 63 with a frame-like copper packing 61 interposed therebetween as shown in FIGS. 11A and 11B. In this case, the surface 11A having the sample introducing ports 5 formed therein is in contact with the space closed by the copper packing 61, and a gas is introduced into the space noted above by a gas introducing tool 64. The gas introduced into the particular space flows through the fine fluid channel 21 so as to be spurted to the outside from the edge section 41 of the fine fluid channel 21 in the cut surface 42. As a result, where the hole section is formed in the top coat material layer formed on the cut surface 42 before the baking process, it is possible to prevent the hole section from being closed. Also, where the hole section is not formed before the baking process, it is possible to form the hole section 35. Incidentally, if the copper packing 61 is pushed against the first member 11 by using a spring 65 in fixing the first member 11 by the tools 62, 63 via the copper packing, it is possible to prevent the first member 11 from being cracked. A packing 61 may be made of a heat resistance resin such as polyimide in stead of the copper.

Also, the gas blowing method shown in FIGS. 11A and 11B can be employed not only in the case of blowing a gas during the baking process but also in the case of employing, for example, the spray coating method. In this case, it is possible to use a rubber packing in place of the copper packing 61 because the first member 11 is not heated to a high temperature.

Also, the membrane-forming process described above is directed to the case of forming the elastic membranes 30, 31 on the cut surfaces 42, 43 alone of the first member 11 and the third member 13, respectively. However, it is also possible to form the second elastic membranes 70, 71 each having a second communicating hole communicating with the second fine fluid channel 22 on the cut surfaces 45, 46 alone of the second member 12 in place of forming the elastic membranes 30 and 31 noted above, as shown in FIG. 12.

Figure 12:
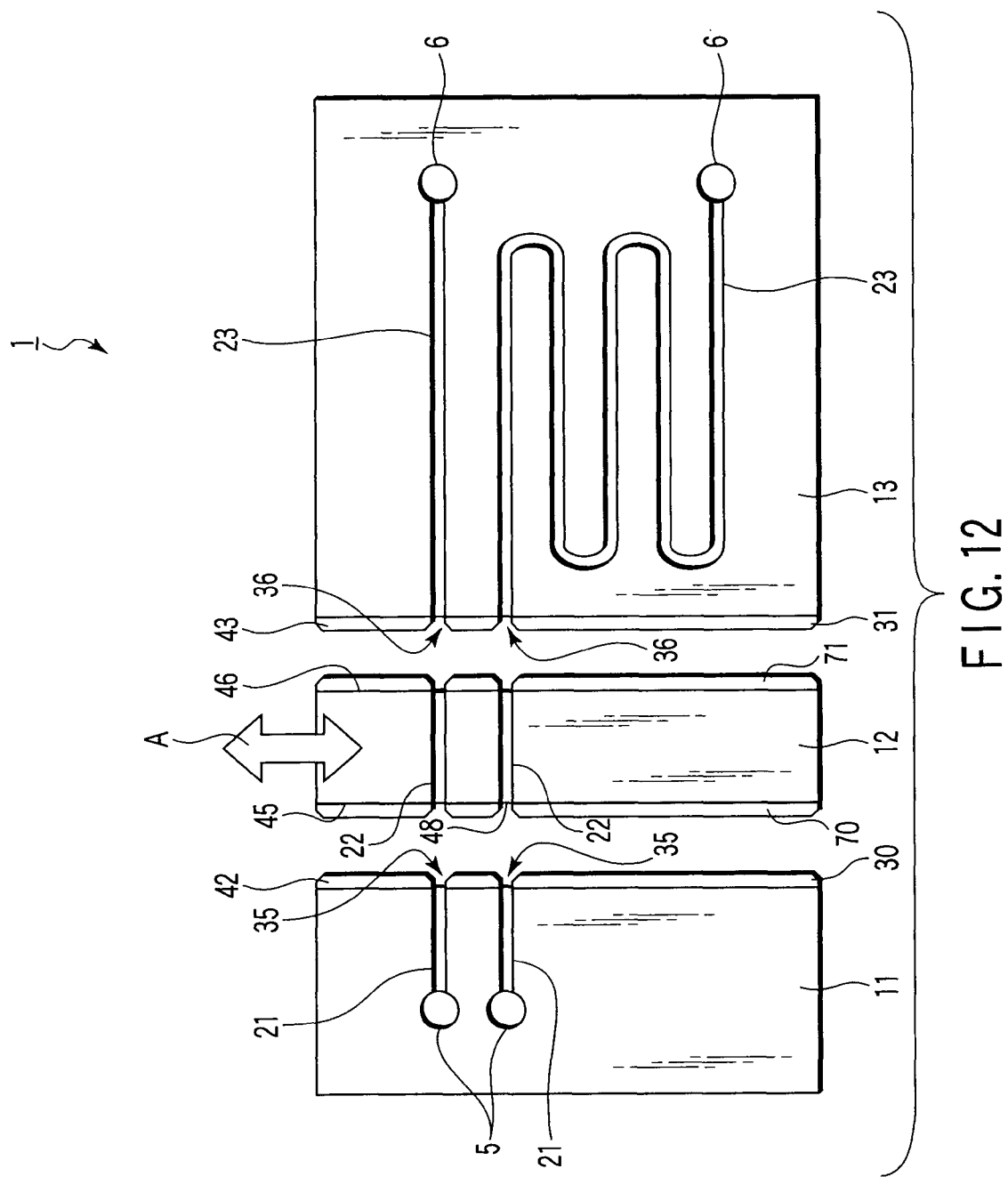
FIG. 12 is a perspective plan view showing in a partly dismantled fashion the inner structure of a slide valve apparatus according to another embodiment of the present invention.

Also, the membrane-forming process described above is directed to the case of forming the elastic membranes 30, 31 on the cut surfaces 42, 43 alone of the first member 11 and the third member 13, respectively. However, it is also possible to form the first elastic membranes 30, 31 each having a first communicating hole on the cut surface 42 of the first member 11 and on the cut surface 43 of the third member 13 and to form second elastic membranes 70, 71 each having a second communicating hole on the cut surfaces 45 and 46 of the second member 12, as shown in FIG. 12.

Also, the membrane-forming process described above is directed to the case of forming the elastic membranes 30, 31 on the cut surfaces 42, 43 alone of the first member 11 and the third member 13, respectively. However, it is also possible to form the first elastic membrane 30 having a first communicating hole in the cut surface 42 of the first member 11 and a second elastic membrane 71 having a second communicating hole on the cut surface 46 of the second member 12, as shown in FIG. 12.

Also, the membrane-forming process described above is directed to the case of polishing the surfaces of the elastic membranes 30, 31 formed on the first and third members 11 and 13, respectively. However, the present invention is not limited to the particular case. To be more specific, it is also possible to apply the polishing treatment to the cut surfaces 45, 46 of the second member 12 along which slide the elastic membranes 30, 31, respectively, in addition to the polishing treatment applied to the surfaces of the elastic membranes 30, 31.

Also, where the second elastic membranes are formed on the cut surfaces 45, 46 alone of the second member 12, it is possible to employ any of the method of applying a polishing treatment to the surfaces alone of these elastic membranes and the method of applying a polishing treatment to the second elastic membranes as well as to the cut surface 42 of the first member 11 and the cut surface 43 of the third member 13 along which slide the second elastic membranes so as to improve the adhesiveness in the sliding section, thereby suppressing the leakage of the fluid.

In the slide valve apparatus 1 according to an embodiment of the present invention, it is possible to suppress the leakage of the fluid flowing within the fine fluid channels 21, 22, 23 in the slide contact section between the first member 11 and the second member 12 and in the slide contact section between the second member 12 and the third member 13 so as to make it possible to bring the first member 11, the second member 12 and the third member 13 into mutual contact with a prescribed pushing force by arranging the elastic membranes 30, 31, 70, and 71 formed of an elastic body, as shown in FIG. 12.

Each of the elastic membranes 30 and 31 is formed in a thickness of 10 μm to 100 μm (i.e., about 40 μm in this embodiment of the present invention) so as to permit these elastic membranes to exhibit an elasticity high enough to suppress the leakage of the fluid. Also, since a gas blowing treatment is performed in forming the elastic membranes 30 and 31, formed are the communicating holes 35, 36 communicating with the fine fluid channels 21, 23 on the cut surface 42 of the first member 11 and the cut surface 43 of the third member 13 having the elastic membranes 30 and 31 formed thereon, respectively.

It should also be noted that, in the case of forming the elastic membranes 30, 31 having a large thickness, it is possible for the communicating holes 35, 36 communicating with the fine fluid channels 21, 23, respectively, to be closed during the baking process. However, it is possible to prevent without fail the communicating holes 35, 36 from being closed by applying a gas blowing treatment during the baking process as described previously in conjunction with FIGS. 11A and 11B.

Also, the surfaces of the elastic membranes 30, 31 can be flattened by applying a polishing treatment to the surfaces of the elastic membranes 30, 31 so as to improve the adhesiveness of the elastic membranes 30, 31 to the second member 12, thereby suppressing the leakage of the fluid.

As described above, it is possible to form the elastic membranes 30, 31 having a thickness large enough to ensure the communicating state with the fine fluid channels 21, 22, 23 so as to realize a slide valve apparatus capable of suppressing the fluid leakage in the slide contact sections.

Other Embodiments

The technical scope of the present invention is not limited to the embodiment described above. In other words, the description and the drawings forming a part of the disclosure given above should not be construed to limit the technical scope of the present invention. It may be possible for those skilled in the art to arrive at various modifications in the type of the embodiments, examples and applications thereof from the disclosure given above.

For example, FIG. 1 shows that each of the first member 11 and the second member 12 is provided with a single fine fluid channel alone, i.e., are provided with the first fine fluid channel 21 and with the second fine fluid channel 22 alone, respectively. However, it is possible for an optional number of fine fluid channels to be formed in each of these first and second members 11 and 12. It is also possible for the fine fluid channel to have an optional construction. This is also the case with the fine fluid channels shown in the other drawings.

Also, the slide valve apparatus 1 shown in FIG. 1 comprises three members consisting of the first member 11, the second member 12 and the third member 13, and the second member 12 is slid mainly. However, it is possible for the slide valve apparatus 1 to be formed of a large number of members and to be constructed to permit a large number of members to be slidable.

Incidentally, the size and height of, for example, the slide valve apparatus 1 are referred to in describing the slide valve apparatus 1 with reference to the accompanying drawings. However, these numeral values are no more than examples. Needless to say, the size and height of the slide valve apparatus 1, etc. are not limited to the numeral values given in the description given above.

Needless to say, the present invention covers various modes of embodiments that are not included in the description given above. What should be noted is that the technical scope of the present invention is determined solely by the inventive subject matter defined by the appended claims and their equivalents, as apparent from the description given above.

According to the present invention, it is possible to provide a slide valve apparatus capable of suppressing the liquid leakage in the sliding section and a method of manufacturing the particular slide valve apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A slide valve apparatus, comprising:
a first plate member having a first fluid channel configured to flow a fluid, and having a first cutout surface on which a first opening of the first fluid channel is formed;
a second plate member having a second fluid channel configured to flow the fluid, and having a second cutout surface on which a second opening of the second fluid channel is formed, wherein the first and second plate members are formed from a single substrate unit having an elongated channel formed in the single substrate unit, the single substrate unit being cut and separated into the first and second plate members having the first and second cutout surfaces, respectively, and the elongated channel being separated into the first and second fluid channels; and
a first elastic membrane formed on the first cutout surface and having a first communicating hole which aligns with the first opening and communicates with the first fluid channel, wherein
the second cutout surface is slidable on the first elastic membrane and is positioned in a communicating state wherein the first fluid channel is communicated to the second fluid channel through the first opening, the first communicating hole, and the second opening or is positioned in a shutting state wherein the second opening of the second fluid channel is shut by the first elastic membrane and the first communicating hole is shut by the second cutout surface.

2. A slide valve apparatus, comprising:
a first plate member having a first fluid channel configured to flow a fluid, and having a first cutout surface on which a first opening of the first fluid channel is formed;
a second plate member having a second fluid channel configured to flow the fluid, and having a second cutout surface on which a second opening of the second fluid channel is formed, wherein the first and second members are formed from a single substrate unit having an elongated channel formed in the single substrate unit, the single substrate unit being cut and separated into the first and second plate members having the first and second cutout surfaces, respectively, and the elongated channel being separated into the first and second fluid channels; and
a first elastic membrane formed on the second cutout surface and having a first communicating hole which substantially aligns with the second opening and communicates with the second fluid channel, wherein
the first cutout surface is slidable on the first elastic membrane and is positioned in a communicating state wherein the first fluid channel is communicated to the second fluid channel through the first opening, the first communicating hole, and the second opening or is positioned in a shutting state wherein the first opening of the first fluid channel is shut by the first elastic membrane and the first communicating hole is shut by the first cutout surface.

3. The slide valve apparatus according to claim 1, further comprising:
a second elastic membrane formed on the second cutout surface and having a second communicating hole which aligns with the second opening and communicates with the second fluid channel, wherein
the first elastic membrane is slidable on the second elastic membrane and is positioned in the communicating state wherein the first fluid channel is communicated to the second fluid channel through the first opening, the first and second communicating holes and the second opening or the shutting state wherein the first communicating hole is shut by the second elastic membrane and the second communicating hole is shut by the first elastic membrane.

4. The slide valve apparatus according to claim 3, wherein the second plate member has a third cutout surface having a third opening opposite to the second cutout surface, and said slide valve apparatus further comprises:
a third plate member, having a third fluid channel configured to flow the fluid, and a fourth cutout surface on which a fourth opening of the third fluid channel is formed, wherein the third plate member is formed from the single substrate unit, the single substrate unit being cut and separated into the third plate member having the fourth cutout surface, and the elongated channel being separated into the third fluid channel; and
a third elastic membrane formed on the fourth cutout surface and having a third communicating hole which aligns with the fourth opening and communicates with the third fluid channel, wherein the third cutout surface is slidable on the third elastic membrane and is positioned in the communicating state wherein the third fluid channel is communicated with the second fluid channel through the fourth opening, the third communicating hole, and the third opening.

5. The slide valve apparatus according to claim 4, further comprising:
  a fourth elastic membrane formed on the third cutout surface and having a fourth communicating hole which aligns with the fourth opening and communicates with the second fluid channel, wherein
  the third elastic membrane is slidable on the fourth elastic membrane and is positioned in the communicating state wherein the third fluid channel is communicated to the second fluid channel through the third opening, the third and fourth communicating holes, and the fourth opening or the shutting state in which the third communicating hole is shut by the fourth elastic membrane and the fourth communicating hole is shut by the third elastic membrane.

6. The slide valve apparatus according to claim 1, wherein the first elastic membrane has a thickness of 20 to 60 µm.

7. The slide valve apparatus according to claim 2, wherein the first elastic membrane has a thickness of 20 to 60 µm.

8. The slide valve apparatus according to claim 1, wherein a tapered section is formed in the first communicating hole.

9. The slide valve apparatus according to claim 2, wherein a tapered section is formed in the first communicating hole.

10. The slide valve apparatus according to claim 1, wherein the first elastic membrane is formed as a top coating layer by spraying a top coat material.

11. The slide valve apparatus according to claim 2, wherein the second elastic membrane is formed as a top coating layer by spraying a top coat material.

12. The slide valve apparatus according to claim 8, wherein the tapered section has a spread area of 1 µm to 50 µm along a height direction of the first fluid channel, when the first communicating hole has a thickness of substantially 40 µm and the first fluid channel has a cross section having a width of substantially 100 µm and a height of substantially 40 µm.

13. The slide valve apparatus according to claim 9, wherein the tapered section has a spread area of 1 µm to 50 µm along a height direction of the first fluid channel, when the first communicating hole has a thickness of substantially 40 µm and the first fluid channel has a cross section having a width of substantially 100 µm and a height of substantially 40 µm.

14. The slide valve apparatus according to claim 3, wherein the second elastic membrane is formed as a top coating layer by spraying a top coat material.

15. The slide valve apparatus according to claim 4, wherein the third elastic membrane is formed as a top coating layer by spraying a top coat material.

16. The slide valve apparatus according to claim 5, wherein the fourth elastic membrane is formed as a top coating layer by spraying a top coat material.

* * * * *